United States Patent Office 3,468,846
Patented Sept. 23, 1969

3,468,846
POLYCARBONATE PLASTICS
Ludwig Bottenbruch, Krefeld-Bockum, and Hermann Schnell, Krefeld-Urdingen, Germany, assignors to Farbenfabriken Bayer Aktiengesellschaft, Leverkusen, Germany, a corporation of Germany
No Drawing. Continuation-in-part of application Ser. No. 23,356, Apr. 20, 1960. This application Dec. 1, 1965, Ser. No. 510,948
Int. Cl. C08g 17/14, 17/13
U.S. Cl. 260—47                          5 Claims

ABSTRACT OF THE DISCLOSURE

A process for preparing high molecular weight linear polycarbonates having improved physical characteristics by preparing a polycarbonate having an average molecular weight higher than that desired by reacting a dihydric phenol with a carbonate precursor under polycarbonate-forming conditions, and then hydrolyzing a solution of the polycarbonate in an inorganic solvent with an aqueous alkali metal hydroxide solution to decrease the average molecular weight of the polycarbonate by a maximum of about ⅓ of the original average molecular weight and then terminating the hydrolysis by separating the polycarbonate from the aqueous alkali metal hydroxide solution.

---

This invention relates generally to the preparation of polycarbonate plastics and more particularly to a method of preparing polycarbonate plastics having improved physical characteristics and is a continuation-in-part of Application Serial No. 23,356 filed Apr. 20, 1960, now abandoned.

It has been proposed heretofore to prepare linear, high molecular weight, thermoplastic polycarbonates by reacting a dihydroxy compound such as, for example, a dihydroxy-aryl alkane, a dihydroxy-aryl sulphone, a dihydroxy-aryl sulphoxide, a dihydroxy-aryl sulphide or a dihydroxy-aryl ether, with phosgene or the like. Such plastics usually have very good physical characteristics such as, for example, high tensile strength, high impact strength, notch toughness and favorable Marten's number. Certain of these physical characteristics vary somewhat depending upon variations in the production process. Sometimes, inadvertent minor variations in the process will lead to reduction in impact strength, notch strength, or tensile strength.

It is therefore an object of this invention to provide a method for consistently producing linear, high molecular weight polycarbonate plastics having good physical characteristics.

Still another object of the invention is to provide a method for providing polycarbonate plastics having improved notch strength and elongation.

Still another object of the invention is to provide a method for making polycarbonate plastics which is more flexible and does not require such rigid control as has been necessary heretofore for preparing polycarbonate plastics having optimum physical characteristics.

A further object of this invention is to provide high molecular weight, linear, thermoplastic polycarbonates, the "heterogeneity" (defined hereinafter) of which, in relation to their relative viscosity (measured in a 0.5 percent methylene chloride solution at 25° C.) is not greater than that given in Table 1 herein.

The foregoing objects and others are accomplished in accordance with this invention, generally speaking, by providing a process for making linear, high molecular weight, thermoplastic polycarbonates wherein the components of a polycarbonate reaction mixture are reacted until a polycarbonate having a molecular weight greater than that desired in the final product is obtained and this polycarbonate is then subjected to a degradation process in a liquid phase until the variations in the molecular weight are selectively reduced, thereby lowering the average molecular weight to that desired. Polycarbonates which have been prepared beforehand may also be treated according to the invention more fully described hereinafter.

Any suitable method can be used for forming the polymer of the original molecular weight such as, for example, the process described by Schnell et al. in Canadian Patent 578,585, issued June 30, 1959, the disclosure of which is incorporated herein by reference. In such a process the di-monohydroxyaryl alkane is reacted with phosgene, a carbonic acid diester, or the like, until the molecular weight is above that desired in the finished product.

According to the present invention, any suitable process may be used to degrade a polycarbonate to the average molecular weight desired by reducing the variations in its molecular weight spread, including, for example, hydrolysis, alcoholysis, phenolysis and the like. It has been found that polycarbonate plastics produced in accordance with this invention have higher elongation and greater notch strength than polycarbonates of a similar molecular weight prepared by the heretofore available processes which involve simply reacting the components of a polycarbonate until the desired molecular weight is achieved. Further, investigations have proved that polycarbonates produced in accordance with this invention have an essentially narrower variation of molecular weights than non-deploymerized polycarbonates.

The term "heterogeneity" defined by G. B. Schulz (Z. physik. Chem. (b) 43 (1939) 25; 47 (1940) 155; Z. Elektrochem. 60 (1956) 199) is the characteristic designation by which the distribution of high molecular weight linear substances may be defined. "Heterogeneity" is represented by the equation:

$$U = \frac{P_w}{P_n} - 1$$

where U=heterogeneity; $P_w$=average weight of the molecular weight; $P_n$=numerical mean of the molecular weight.

Further, the mechanical properties of a high molecular weight linear substance depend not only on its molecular weight distribution but also on its mean molecular weight. Thus high molecular weight substances have at a higher molecular weight better properties than at lower molecular weight. The average molecular weight must therefore be considered in order to judge the "quality" of a high molecular weight substance from its heterogeneity.

In Table 1, therefore, certain relative viscosities are correlated to the "heterogeneity" which according to our experiences represent critical values for good mechanical properties. The viscosities are measured in 0.5 percent methylene chloride solutions at 25° C.; they are proportional to the molecular weight. The "heterogeneities" are determined by fractionation. Polycarbonates which have smaller "heterogeneities" than those shown in Table 1 for their relative viscosities have good mechanical properties.

TABLE 1

| Relative viscosity: | Heterogeneity |
|---|---|
| 1.28 | 0.21 |
| 1.30 | 0.32 |
| 1.32 | 0.41 |
| 1.34 | 0.47 |
| 1.36 | 0.52 |
| 1.38 | 0.57 |
| 1.40 | 0.62 |
| 1.42 | 0.65 |
| 1.44 | 0.68 |
| 1.46 | 0.71 |
| 1.48 | 0.74 |
| 1.50 | 0.77 |

Any reduction in molecular weight will lead to some improvement in the finished product so the invention broadly contemplates the preparation of linear, thermoplastic polycarbonates of any average molecular weight, by first making one of a higher molecular weight than desired. A polycarbonate prepared by known polymerization processes contains molecules of various molecular weights. During the degradation process, only the higher molecular weights are materially reduced. It has been found that best results are obtained if the average molecular weight of the polycarbonate before the degradation to the average molecular weight of the polycarbonate after the degradation corresponds to the ratio of about 3:2. Ordinarily, polycarbonates used for molding have an average molecular weight within the range of about 30,000 to 40,000 while polycarbonates used for casting films might have molecular weights of 70,000 or more.

The average molecular weight of a linear polycarbonate is indicated by its viscosity. Advantage is taken of this fact in determining the amount of polymerization required in the first step of the process and the amount of degradation required in the second step. The relative viscosities determined in a standard Ostwald viscosimeter which are usually most advantageous for polycarbonates made from 2,2-(4,4'-dihydroxy-diphenyl)-propane and phosgene are given in the following table:

TABLE 2.—RELATIVE VISCOSITY
[Mixture in 0.5 percent solution of methylene chloride at 25° C.]

| Starting product | Average mol weight | End product | Average mol weight |
|---|---|---|---|
| 1.43 | 46,000 | 1.30 | 30,000 |
| 1.56 | 61,000 | 1.40 | 43,000 |
| 1.70 | 76,000 | 1.50 | 54,000 |
| 1.87 | 94,000 | 1.60 | 66,000 |

Any suitable method for reducing the molecular weight of the polycarbonate may be used in the practice of this invention, such as hydrolysis, for example. The simplest method for hydrolyzing a polycarbonate is to treat a solution of a polycarbonate with an aqueous alkali metal hydroxide solution; however, this method takes a long time and should be accelerated by heating, for example. It is preferred, however, to promote the hydrolysis by the addition of a catalyst; some suitable catalysts are, for example, ammonia, primary and secondary amines and especially tertiary amines. The tertiary amine can be any suitable tertiary amine, such as, for example, trimethylamine, triethylamine, pyridine, N-methyl-morpholine, N-ethyl - morpholine, di-methyl-hexahydro-aniline, diethyl-hexahydro-aniline and the like.

The amount of the catalyst to be used to promote the hydrolysis of the polycarbonate is within the range of about 0.1 to about 0.5 percent, based on the organic phase of the polycarbonate. This is particularly significant when one considers that in the production of high molecular weight polycarbonates, only about 0.05 percent of a tertiary amine based on the total reaction mixture need be used.

In addition to the hydrolysis process, any suitable alcoholysis or phenolysis process may be used to reduce the variations in the molecular weight of polycarbonates and thereby reduce the average molecular weight to that desired. For example, the polycarbonate may be treated with an alcohol such as methanol, ethanol, the propanols and the butanols or aqueous solutions thereof; monophenols, such as, for example, the phenols, the cresols, the xylenols and p-tert. butyl phenol; and polyphenols, such as, for example, resorcinol, hydroquinone, dihydroxydiphenyl and bisphenols. A small amount of an alkali, such as sodium hydroxide or potassium hydroxide, can be included in the solution if desired when the alcoholysis or phenolysis is being carried out.

It is possible, by using the right amount and concentration of the solution used in the degrading or decomposition step in conjunction with time and temperature factors to predetermine the final molecular weight of the polycarbonate being treated. Consequently, if desired, the reduction in the average molecular weight of the polycarbonate can be achieved at the same time as the polycarbonates are being produced. In this way, the final molecular weight is obtained in the product before it is separated from the aqueous reaction liquid.

Alternatively, a high molecular weight polycarbonate can be melted by any known method such as in an extruder and the molecular weight reduced by additions of a mono- or polyphenol or a diaryl carbonate, such as diphenyl, dicresyl and dinaphthyl carbonate, to the molten polycarbonate. In this way, the extruded material will have the desired molecular weight. By reacting the initial polycarbonate with a phenol its average molecular weight is decreased by phenolisation, by reacting with a diarylcarbonate by interesterification.

In the preparation of the polycarbonate, any suitable di-(monohydroxyaryl)-alkaline may be used; some such suitable compounds are, for example, (4,4'-dihydroxy-diphenyl)-methane,
2,2-(4,4'-dihydroxy-diphenyl)-propane,
1,1-(4,4'-dihydroxy-diphenyl)-cyclohexane,
1,1-(4,4'-dihydroxy-3,3'-dimethyl-diphenyl)-cyclohexane,
1,1-(2,2'-dihydroxy-4,4'-dimethyl-diphenyl)-butane,
2,2-(2,2'-dihydroxy-4,4'-ditertiary butyl-diphenyl)-propane, or
1,1-(4,4'-dihydroxy-diphenyl)-1-phenylethane, furthermore methane derivatives which carry besides two hydroxyaryl groups an alkyl residue with at least two carbon atoms and a second alkyl residue with one or more carbon atoms, such as 2,2-(4,4'-dihydroxy-diphenyl)-butane,
2,2-(4,4'-dihydroxy-diphenyl)-pentane,
3,3-(4,4'-dihydroxy-diphenyl)-pentane,
2,2-(4,4'-dihydroxy-diphenyl)-hexane,
3,3-(4,4'-dihydroxy-diphenyl)-hexane,
2,2-(4,4'-dihydroxy-diphenyl)-4-methyl-pentane,
2,2-(4,4'-dihydroxy-diphenyl)-heptane,
4,4-(4,4'-dihydroxy-diphenyl)-heptane or
2,2-(4,4'-dihydroxy-diphenyl)-tridecane.

Suitable di-(monohydroxyaryl)-alkanes the two aryl residues of which are different are for example 2,2-(4,4'-dihydroxy-3'-methyl-diphenyl)-propane and 2,2-(4,4'-dihydroxy-3-methyl - 3'-isopropyl - diphenyl)-butane. Suitable di-(monohydroxyaryl)-alkanes, the aryl residues of which carry halogen atoms are for instance 2,2-(3,5,3',5',-tetra-chloro-4,4'-dihydroxy-diphenyl)-propane,
2,2-(3,5,3',5'-tetra-bromo-4,4'-dihydroxy-diphenyl)-propane,
(3,3'-di-chloro-4,4'-dihydroxy-diphenyl)-methane, and
2,2'-dihydroxy-5,5'-difluorodiphenyl-methane.

Suitable di-(monohydroxyaryl)-alkanes the alkyl residue of which linking the two benzene rings is substituted by an aryl residue are for instance (4,4'-dihydroxy-diphenyl)- phenyl - methane and 1,1-(4,4' - dihydroxydiphenyl)-1-phenyl-ethane. These compounds can be produced in known manner.

In order to obtain special properties, mixtures of various di-(monohydroxyaryl)-alkanes can also be used, thus mixed polycarbonates are obtained.

The conversion of the aforesaid di-(monohydroxyaryl)-alkanes into linear, high molecular weight, thermoplastic polycarbonates by reacting with the mentioned derivatives of the carbonic acid may be carried out as known in the art. For instance, the di-(monohydroxyaryl)-alkanes can be re-esterified with carbonic acid diesters, e.g. dimethyl-, diethyl-, dipropyl-, dibutyl-, diamyl-, dioctyl-, dicyclohexyl-, diphenyl-, and di- o-, p-tolyl-carbonate, at elevated temperatures from about 50° C. to about 320° C. and especially from about 120° C. to about 300° C.

The polycarbonates can also be produced by introducing phosgene into solutions of di-(monohydroxyaryl)-alkanes in organic bases, such as dimethylaniline, diethylaniline, trimethylamine, and pyridine, or into solutions of di-(monohydroxyaryl)-alkanes in indifferent organic solvents, such as benzine, ligroin, cyclohexane, methylcyclohexane, benzene, toluene, xylene, chloroform, methylene chloride, carbon tetrachloride, trichlorethylene, dichloroethane, methylacetate, and ethylacetate with the addition of an acid-binding agent as mentioned above.

A process particularly suitable for producing polycarbonates consists of introducing phosgene into the aqueous solution or suspension of alkali metal salts such as lithium-, sodium-, potassium-, and calcium salts of the di-(monohydroxyaryl)-alkanes, preferably in the presence of an excess of a base such as lithium-, sodium-, potassium-, and calcium hydroxide or carbonate.

The conversion in the aqueous solution is promoted by the addition of inert organic solvents of the kind mentioned above which are capable of dissolving phosgene and eventually the produced polycarbonate.

The phosgene may be used in an equivalent amount. Generally, however, it is preferable to use an excess of the phosgene.

Finally, it is also possible to react the di-(monohydroxyaryl)-alkanes with about equimolecular amounts of bis-chlorocarbonic acid esters of di-(monohydroxyaryl)-alkanes under corresponding conditions.

In the production of polycarbonates according to the various processes, it is advantageous to employ small amounts of reducing agents, for example, sodium- or potassium sulphide, sulphite and -dithionite or free phenol and p-tertiary butyl phenol. It is to be understood that any and all polycarbonates may be treated in accordance with this invention, the inventive concept inhering in the process for selectively reducing the variations in the molecular weight of the polymer and not in the polycarbonate to be treated.

In order better to describe and further clarify the invention, the following are examples thereof with the parts by weight and parts by volume being in the relationship of grams to millimeters.

Example I

About 2365 parts by weight phosgene are passed, with stirring at 25° C., in the course of two hours into a mixture of about 4540 parts by weight 2,2-(4,4'-dihydroxy-diphenyl)-propane, about 60 parts by weight para-tertiary butyl phenol, 15,000 parts water, 12,000 parts by weight methylene chloride and 5150 parts by weight 45 percent sodium hydroxide solution. 16 parts by weight triethylamine are subsequently added thereto. The organic phase of the mixture becomes highly viscous in about one hour and is then washed in a kneader with dilute sodium hydroxide solution, then with dilute hydrochloric acid and finally with water until free of electrolytes. The organic phase is broken up. After evaporation of the methylene chloride and subsequent drying at 140° C. and 0.1 mm. Hg, a granulate is obtained having a viscosity of 1.412. The granulate is worked-up in an injection molding machine to forks which have the properties given in Table 2 opposite (A1).

When the foregoing process is repeated with the same conditions and the same chemicals except that about 58 parts para-tertiary butyl phenol are used instead of 60 parts para-tertiary butyl phenol, the product has a viscosity of about 1.420 and the properties set opposite (A2) in Table 2.

When about 55 parts by weight para-tertiary butyl phenol are used instead of 60 parts para-tertiary butyl phenol and everything else remains the same, the product has a viscosity of 1.456 and the physical properties set opposite (A3) in Table 2.

Example II

The procedure of Example I is carried out but using 30 parts by weight para-tertiary butyl phenol. The highly viscous organic phase (relative viscosity—1.558) obtained after the addition of 16 parts by weight triethylamine, is kneaded in a kneader with the aqueous alkaline layer and a further 50 parts by weight triethylamine and 42 parts by weight para-tertiary butyl phenol and subsequently washed free of electrolytes in the manner described in Example I with dilute sodium hydroxide solution, dilute hydrochloric acid and water and finally worked-up. The dried granulate has a relative viscosity of 1.415. It is worked-up to forks in the manner described in Example I which have the properties indicated in Table 2 opposite (B1).

When about 27 parts para-tertiary butyl phenol are substituted for the 30 parts in the foregoing and everything else remains the same, the viscous organic phase has a viscosity of 1.572 and the degraded product has a viscosity of 1.423. The physical properties are set opposite (B2) in Table 2.

When about 22 parts by weight para-tertiary butyl phenol are substituted for the 30 parts para-tertiary butyl phenol and everything remains the same in the foregoing example, the viscous organic phase has a viscosity of 1.569 and the degraded product has a viscosity of 1.452. The physical properties are set opposite (B3) in Table 2.

TABLE 2

| | Relative Viscosity | | Tensile strength, kg./cm.$^2$ | Elongation, percent | Fatigue strength, kg./cm.$^2$ | Bending angle, ° | Notch strength, cm. kg./cm.$^2$ | Marten's number, ° C. |
|---|---|---|---|---|---|---|---|---|
| | Starting product | After decomp. | | | | | | |
| Polycarbonate: | | | | | | | | |
| A1 | 1.412 | | 664 | 9 | 1,225 | 77 | 10.6 | 20 |
| A2 | 1.420 | | 680 | 8 | 1,214 | 55 | 7.6 | 105 |
| A3 | 1.468 | | 688 | 11 | 1,245 | 79 | 7.8 | 104 |
| B1 | 1.558 | 1.451 | 656 | 66 | 1,154 | 87 | 62.6 | 126 |
| B2 | 1.572 | 1.423 | 661 | 62 | 1,155 | 85 | 62.8 | 124 |
| B3 | 1.569 | 1.452 | 655 | 65 | 1,136 | 86 | 58.7 | 126 |

The polycarbonate plastics produced in accordance with this invention and having the improved elongation and notch strength are particularly well suited for molding objects in which a high impact resistance is required such as, for example, for molding mining helmets. The polycarbonate plastics provided by the invention can also be used in casting unsupported films and for insulation on electrical wires and other electrical conductors.

Although the invention has been described in considerable detail in the foregoing for the purpose of illustration, it is to be understood that such detail is solely for this purpose and that variations can be made therein by those skilled in the art without departing from the spirit and scope of the invention except as is set forth in the claims.

Now, the preferred embodiment of the invention may be summarized as follows: It consists in a process for the production of high molecular weight linear polycarbonates having improved physical characteristics which comprises preparing a polycarbonate having an average molecular weight higher than that desired by reacting organic dihydroxy compounds with a carbonate precursor under polycarbonate-forming conditions as known in the art and then decreasing the average molecular weight of the product thus obtained by mixing a solution of said product in an inert organic solvent—if the product is produced by the phosgenation process, preferably the polycarbonate solution obtained directly by this production process—with an aqueous alkaline solution and terminating this molecular weight decreasing step by separating the polycarbonate solution from the alkali as soon as the desired average molecular weight of the polycarbonate is attained. If desired a monohydric phenol as a chain breaker may be present during the molecular weight decreasing step. The decreasing step may be accelerated by carrying out it at an elevated temperature or by the addition of a catalytic amount of a tertiary amine. Especially good results are obtained if the molecular weight decreasing step is terminated as soon as about ⅔ of the original molecular weight of the polycarbonate is attained.

What we claim is:

1. A process for the production of high molecular weight linear polycarbonates having improved physical characteristics which comprises preparing a polycarbonate having an average molecular weight higher than that desired by reacting a dihydric phenol with a carbonate precursor under polycarbonate-forming conditions, then hydrolyzing a solution of the polycarbonate in an inert organic solvent with an aqueous alkali metal hydroxide solution to decrease the average molecular weight of the polycarbonate by about ⅓ of the original average molecular weight, and then terminating the hydrolysis by separating the polycarbonate from the aqueous alkali metal hydroxide solution.

2. Process according to claim 1, wherein a monohydric phenol as a chain breaker is present during the hydrolyzing step.

3. Process according to claim 1, wherein the hydrolyzing step is carried out at an elevated temperature.

4. Process according to claim 1, wherein a catalytic amount of ammonia or a primary, secondary, or a tertiary amine is present during the hydrolyzing step.

5. Process according to claim 1, wherein in the first step a polycarbonate having an average molecular weight of at least about 46,000 is prepared.

References Cited

UNITED STATES PATENTS

| | | | |
|---|---|---|---|
| 3,028,365 | 4/1962 | Schnell et al. | 260—47 |
| 3,046,255 | 7/1962 | Strain et al. | 260—77.5 |
| 3,240,755 | 3/1966 | Cawthon et al. | 260—47 |
| 3,248,414 | 4/1966 | Stevens | 260—463 |
| 3,275,601 | 9/1966 | Schnell et al. | 260—47 |

OTHER REFERENCES

Schnell et al., German application 1,045,657, printed December 1958.

Schnell et al., "Angewandte Chemie," vol. 68, No. 20, pp. 633–640 (October 1956).

Schulz et al., "Makromolekulare Chemie," vol. 29 (January 1959), pp. 93–116, 93–103 and 108–111 only needed.

SAMUEL H. BLECH, Primary Examiner

U.S. Cl. X.R.

117—232